United States Patent [19]
Anderson

[11] 3,846,986
[45] Nov. 12, 1974

[54] GEOTHERMAL PLANT CLEANING SYSTEM

[76] Inventor: James Hilbert Anderson, 1615 Hillock Ln., York, Pa. 17403

[22] Filed: Aug. 27, 1971

[21] Appl. No.: 175,679

[52] U.S. Cl............... 60/641, 60/646, 60/651, 165/95, 134/22 C
[51] Int. Cl............................................ F01b 7/00
[58] Field of Search............ 165/95, 1; 60/641, 646, 60/651; 134/22 R, 22 C, 107; 122/DIG. 4

[56] References Cited
UNITED STATES PATENTS

| | | | |
|---|---|---|---|
| 1,006,197 | 10/1911 | Frasch | 159/23 |
| 2,032,924 | 3/1936 | Eule | 122/DIG. 4 |
| 2,490,759 | 12/1949 | Tyden | 165/95 X |
| 2,822,787 | 2/1958 | Gauger | 122/DIG. 4 |
| 3,274,769 | 9/1966 | Reynolds | 60/26 |

Primary Examiner—Albert W. Davis, Jr.
Attorney, Agent, or Firm—Cushman, Darby & Cushman

[57] ABSTRACT

A method for cleaning the heat exchanger tubes of a geothermal power plant through which flows hot geothermal water containing dissolved minerals such as silica compounds, comprises tapping a source of mineral-free water at ambient temperatures, heating this water to a temperature nearly equal to or above that of the geothermal water and supplying the heated mineral-free water to the heat exchanger tubes to dissolve the minerals deposited thereupon. The heated cleaning water may be added to the hot geothermal water to increase the thermal efficiency of the geothermal power plant.

10 Claims, 3 Drawing Figures

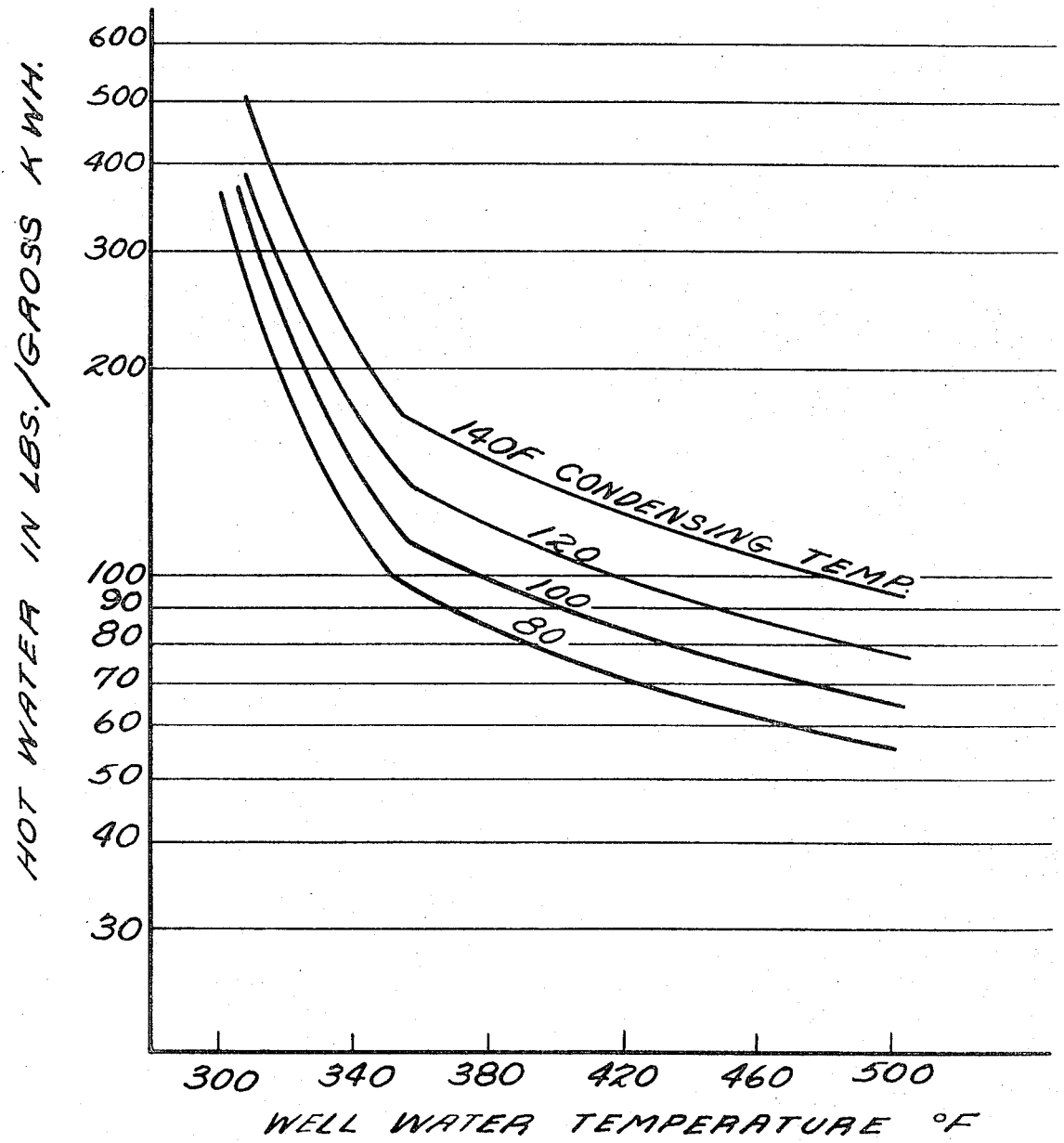

GEOTHERMAL PLANT CLEANING SYSTEM

BACKGROUND OF THE INVENTION

1. Field of the Invention

This invention relates to geothermal power plants wherein hot geothermal water is pumped from ground wells and passed through tubes in heat exchanging relation with a power fluid to heat, vaporize and superheat the power fluid. More specifically, this invention relates to a method for cleaning the tubes of geothermal power plants.

2. Description of the Prior Art

Geothermal power plants are well known to the power producing art. In these plants water from a source of hot geothermal water such as a thermal spring is passed in heat exchange relation to a power fluid to heat, vaporize and superheat the power fluid which is then expanded through a turbine to produce power. The heat exchange relation is usually provided by passing the water through the tubes of at least one shell and tube heat exchanger while the power fluid such as isobutane is passed through the shell side of the heat exchanger.

Since hot geothermal water is in intimate contact with hot rocks while under the earth's surface and since roughly one-fourth to one-half of the earth's crust is comprised of silica and its compounds, it is almost inevitable that this hot water will dissolve enough silica compounds as to become nearly saturated. Of course, the solubility of silica and its compounds in water varies with the temperature of the water. FIG. 1 shows a chart of the solubility of different forms of silica as a function of the water temperature in which they are dissolved. While the various types of silica compounds have different solubilities, the curves of FIG. 1 demonstrate that all of the forms become more soluble as the water temperature increases and less soluble as the water temperature decreases. Thus as the temperature of the hot water exiting from the geothermal source decreases as the water gives up its heat to the power fluid, a certain amount of silica will precipitate out of the cooling water.

In turn, this precipitate will form a coating on the heat exchanger tubes which reduces the efficiency of heat transfer within the heat exchangers and decreases the flow area for the water passing therethrough. Obviously, therefore, it is desirable to clean, periodically, the heat exchanger tubes and the prior art has proposed several cleaning methods. In one method, however, the heat exchanger being cleaned must be removed from the geothermal power plant system and inlet and outlet channels at the ends of the exchanger removed to allow access to the tubes. This method requires a large amount of manpower and results in a long period of uselessness for the heat transfer equipment undergoing cleaning.

A second cleaning method, according to the prior art was to pump a chemical such as hydrofluoric acid through the tubes to remove deposits precipitated thereon. This method did not require the dismantling of the heat exchanger; however, it did require an input of expensive chemicals. A third system known to the prior art is to force high velocity jet of liquid such as water through the tubes of the heat exchanger to scrape deposits therefrom. This method involved the expense of high pressure pumping equipment for pressurizing the water to a high pressure.

SUMMARY OF THE INVENTION

In view of the disadvantage of prior art methods for cleaning the tubes of a heat exchanger, the applicant's invention comprises a method for cleaning the heat exchanger tubes of a geothermal power plant which includes the provision of a flow of relative cold water from a standard city source, which would have a relatively small amount of material dissolved therein, heating this relatively cold water nearly equal to or above the temperature of the geothermal source and introducing his heated water into the tubes of the heat exchangers to dissolve the silica deposited therein. If the cleaning water is heated so that after passing through the tubes of the exchanger undergoing cleaning its temperature exceeds that of the geothermal source and this cleaning water is then introduced to the output from the geothermal source, an increase in geothermal power plant efficiency can be realized due to an increase of input water temperature which will offset a great part of the cost of the tube cleaning system.

BRIEF DESCRIPTION OF THE DRAWINGS

FIG. 3 is a graph of the hot water rate in pounds per gross kilowatt per hour output of the geothermal power plant as a function of the input water temperature to the power plant.

DETAILED DESCRIPTION OF THE INVENTION

Figure 2:
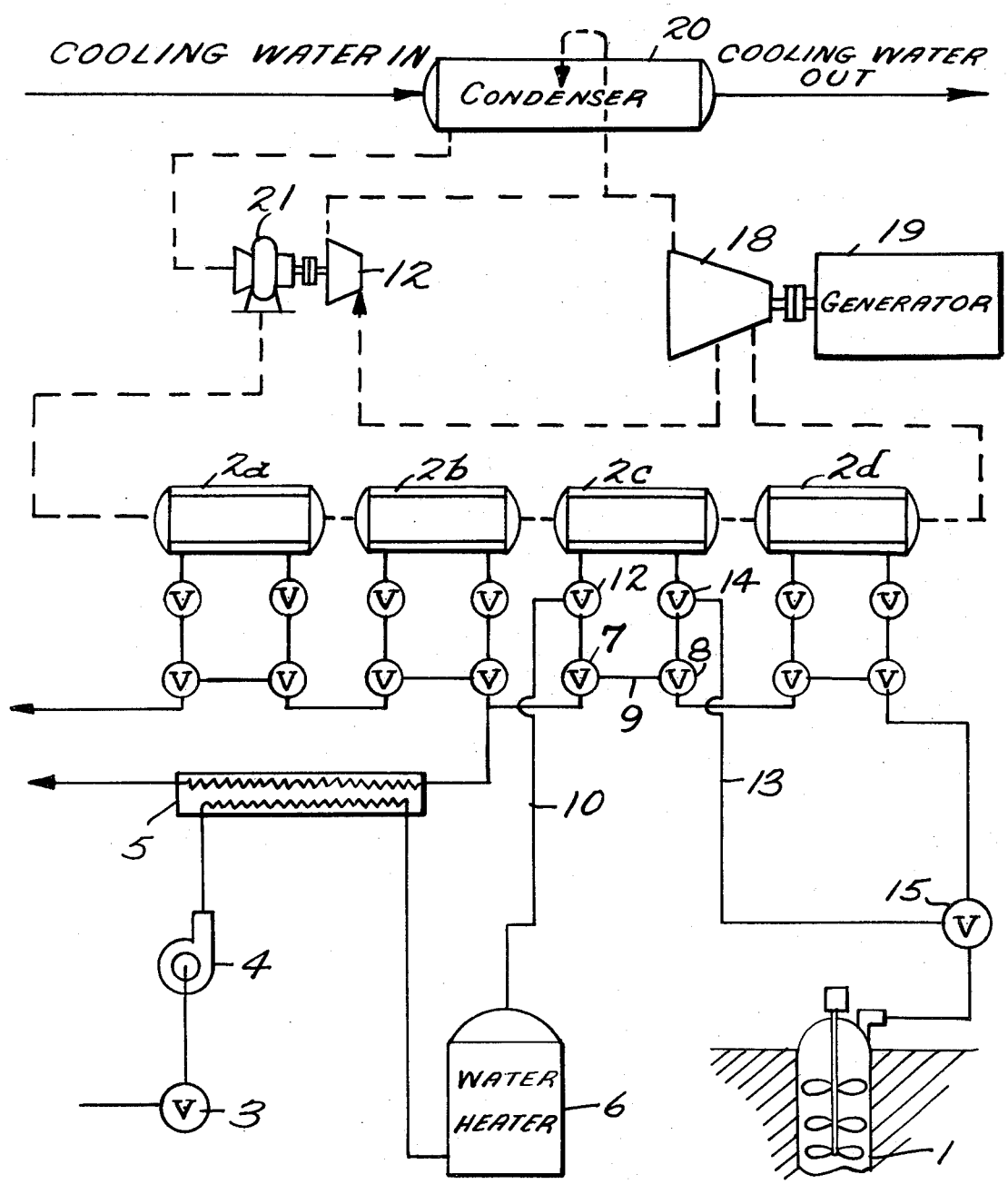
FIG. 2 shows the vapor turbine cycle of a geothermal power plant incorporating a cleaning system in accordance with the invention.

FIG. 2 shows in schematic form the vapor turbine cycle of a geothermal power plant to which a tube cleaning system in accordance with applicant's invention has been added. The conventional geothermal power plant receives geothermal hot water containing silica in solution from the deep well 1 at a temperature of approximately 320°F. The hot water, whose flow path is indicated by a solid line, then passes through the heat exchangers designated by numerals 2a–2d and is exhausted to a waste water reservoir. In the heat exchangers 2a–2d heat is transferred from the hot water to an isobutane stream which is designated by the dashed line. Consequently, the water exits from heat exchanger 2a at a lower temperature, e.g., 164°F, lower than the temperature of the incoming water. Meanwhile the isobutane which enters heater 2a as a liquid at 80°F is heated, vaporized, and passes from heat exchanger 2a as a super-heated vapor at a temperature of approximately 300°F.

Figure 1:
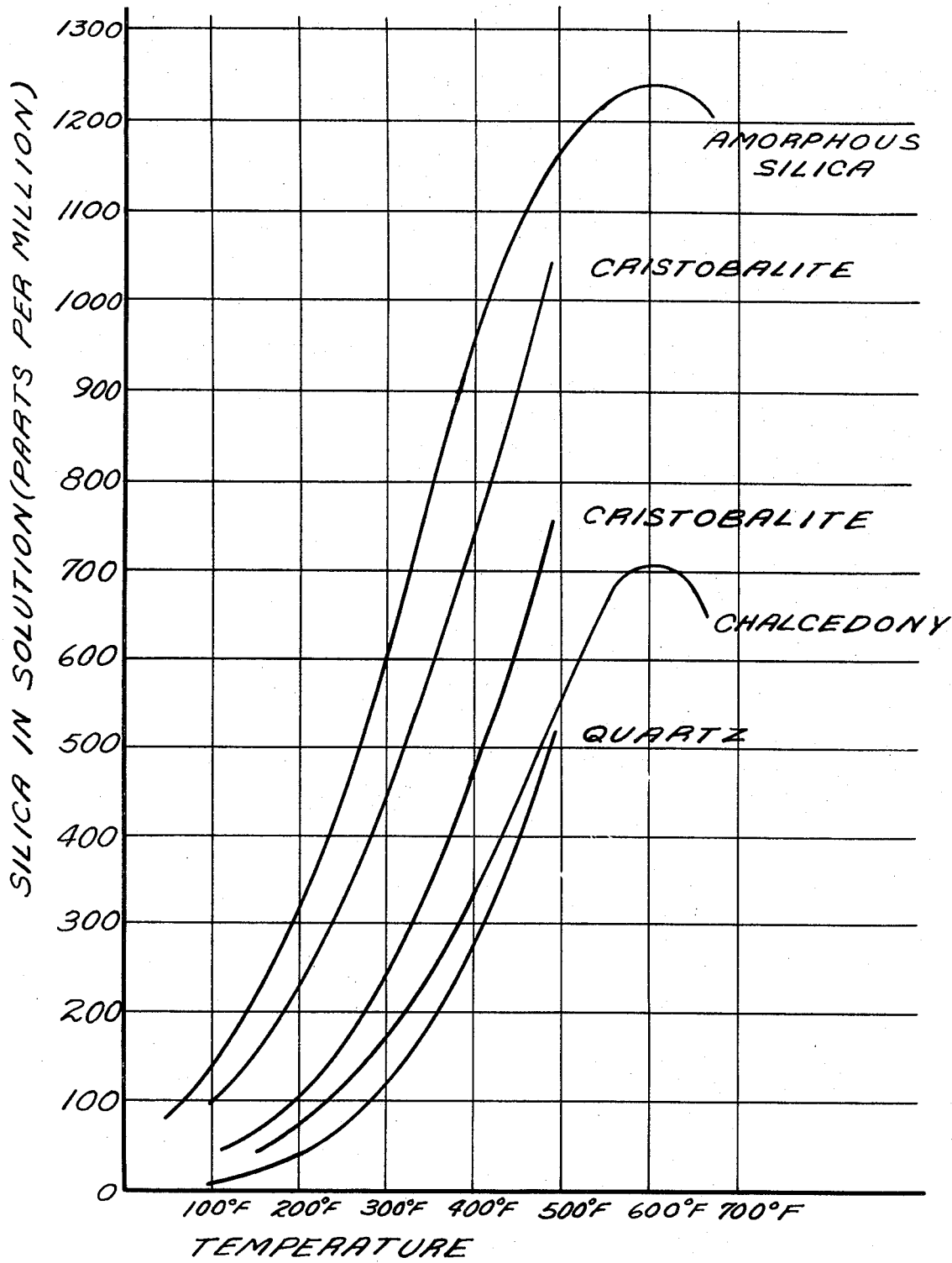
FIG. 1 shows a graph of the solubility of several forms of silica as a function of the temperature of the water in which they are dissolved.

FIG. 1 shows that solubility of the various forms of silica compounds, for example, amorphous silica is approximately 750 parts per million in 325°F water but about 250 parts per million in 164°F water. Thus some amorphous silica is precipitated out of the water as it cools through the heat exchangers 2a through 2d, and this silica may be coated upon the heat exchanger tubes, thereby reducing their heat transfer efficiency.

As FIG. 1 also shows, the other silica compounds are similarly affected by the cooling of the water in which they are dissolved and thus these compounds would also precipitate out of the water at lower temperatures to coat the heat exchanger tubes.

It is the purpose of applicant's invention to clean the heat exchanger tubes of exchangers 2a through 2d in an economical manner by dissolving away precipitated mineral deposits with a stream of heated water which has relatively little dissolved material therein. The cleaning water is preferably initially cold water, such as municipal water, which due to its low temperature is relatively free of dissolved minerals. In the illustrated embodiment the cleaning process includes obtaining a supply of such water through a valve 3, raising the pressure of this water in a pump 4 to slightly above the pressure of the water exiting from the deep well 1, heating the water from the municipal system in a first water heater 5 to, for example, 234°F, further heating the water to above the temperature of the geothermal water by a second water heater 6 which may be of conventional design and which is heated by burning fuel, and then introducing the hot water into any one of the heat exchangers of the series.

If, for example, it is desired to remove the exchanger 2c, from the hot geothermal water cycle for cleaning the tubes thereof, the water flow is detoured around the heat exchanger by bypass valves 7 and 8 and bypass lines 9. The other heat exchangers 2a through 2d have bypass valves and lines identical to the bypass valves and line of exchanger 2c. Thus, any of the heat exchangers can be removed from the exchanger series in an identical manner. Once the appropriate exchanger is removed, the cleaning system is connected through a flexible line 10 to valved coupling 12 on exchanger 2c's water outlet and another line 13 is connected to the valved coupling 14 on exchanger 2c's water inlet.

Line 13 is then connected to the valved coupling 15 which forms a portion of the hot geothermal water inlet line. The exchangers 2a through 2d also have valved coupling identical to couplings 12 and 14 and thus these exchangers may be cleaned in exactly the same manner as is exchanger 2c.

As is shown in FIG. 1, the solubility of amorphous silica in water at 479° is approximately 487 parts per million. In other words, any silica which is dissolved in the geothermal hot water issuing from the deep well at 325°F will be dissolved in the clean water which has been heated to 479°F. Thus, the silica deposited on the tube walls is dissolved as the clean water passes through line 10 and coupling 12 into the exchanger 2c tubes. Since the exchanger 2c has been removed from service, there is little heat loss through the tubes and hence little temperature drop of the cleaning water as it passes through the heater 2c. Thus water at about 479°F issues from the coupling 14 at the water inlet end of the heater 2c, passes through line 13 and is mixed at valved coupling 15 with the geothermal hot water at 325°F. The hotter cleaning water slightly raises the temperature of the geothermal hot water and this, in turn, raises the thermal efficiency of the plant and therefore reduces the amount of water required for each kilowatt hour of energy produced. It is seen from FIG. 3 that in the range of 325°F an increase of a few degrees in temperature reduces the plant water consumption by many pounds per gross kilowatt hour for typical isobutane condensing temperatures. Since a typical cost for investment in plant hot water supply may be $70.00 per kilowatt it is seen that the raising of the input water temperature even 1° is of significant economic importance.

Thus the initial cost of adding such a cleaning system to a geothermal power plant and the operational costs of such a system are at least substantially offset by the increased thermal efficiency of the plant.

It is also of economic importance that the heating fluid used in the water heater 5 is geothermal hot water removed from the isobutane heat exchangers at a point between the heat exchangers 2b and 2c. This further lowers the amount of fuel necessary to heat the water in the conventional water heater 6 to a temperature 479°F and therefore helps to make the method here presented even more attractive relative to those demonstrated in the prior art.

While the above description shows the applicant's method and apparatus for cleaning the tubes of the heat exchangers in a geothermal power plant, the rest of the plant which is conventional will now be described for the sake of better understanding the invention. Thus, the vapor turbine cycle of the plant is as follows: superheated isobutane vapor at 300° upon exiting the heat exchanger 2a is expanded through the turbine 18 which may, for example, power an electricity generator 19 and the low pressure isobutane vapor issuing from the low pressure end of the turbine then enters condenser 20 where it is returned to the liquid state by a heat exchanging relationship with cooling water.

The isobutane is then pumped by pump 21 back to the heat exchangers series 2a through 2d. The pump 21 is, in turn, powered by the turbine section 12 which is powered by a median stage bleed-off of isobutane vapor from the turbine 18 and which passes its low pressure isobutane vapor output in parallel with the turbine 18 vapor output to the condenser 20.

It should be obvious to one skilled in the art that while the above description clearly describes the preferred embodiment, many changes are possible within the scope of the invention. Thus, for example, while four heat exchangers 2a through 2d are shown many more or perhaps fewer heat exchangers may be used in the geothermal power plant. In addition, while the water heating the water heater 5 is drawn from the geothermal hot water stream between heat exchangers 2b and 2c it may be withdrawn, for instance, from conduit between heat exchangers 2c and 2d and would thus have a higher temperature which would make the amount of fuel necessary for the conventional water heater 6 even less than in the embodiment shown.

In addition, one or more space heat exchangers having a construction identical to exchangers 2a through 2d may be provided along with conduits and valves for inserting them into the place in the system vacated by the heat exchanger whose tubes are being cleaned.

What is claimed is:

1. In a system for utilizing the heat obtainable from a source of geothermal hot water of the type including at least one heat exchanger having internal walls through which heat is transmitted from geothermal hot water to another fluid as said geothermal hot water and said other fluid flow through said heat exchanger, the improved means for removing mineral material deposited from said geothermal hot water on surfaces of said internal walls comprising means for heating a body of water of lower mineral content than the geothermal hot water to a temperature at least equal to the temperature of the geothermal hot water flowing through said heat exchanger, said heating means including heat exchange means for passing the substantially mineral-free water in heat exchange relationship with geothermal hot water, and valve and conduit means for replacing the geothermal hot water flowing through said heat exchanger with heated water from said heating means whereby said heated water dissolves mineral material from said surfaces of said internal walls.

2. A system as in claim 1 wherein said heat exchange means is connected to receive geothermal hot water from said heat exchanger in which heat is transferred to the other fluid.

3. In a method for utilizing the heat obtainable from a source of geothermal hot water in a system which comprises at least one heat exchanger, an improved method for cleaning mineral deposits from the surface of an internal wall in the heat exchanger through which wall heat is transferred from a stream of geothermal hot water in contact with said surface to a stream of another fluid, said method comprising: heating a supply of water of lower mineral content than said geothermal hot water from a relatively low temperature to a temperature at least equal to the geothermal hot water flowing through the heat exchanger by passing the low-mineral content water in heat exchange relationship with geothermal hot water; and dissolving said mineral deposits by replacing the stream of geothermal hot water in the heat exchanger with a stream of the heated low-mineral content water.

4. A method as in claim 3 wherein the geothermal hot water passing in heat exchange relationship with the low mineral content water has previously passed through said heat exchanger to heat the other fluid.

5. In a geothermal power plant including a source of geothermal hot water, a power fluid, and heat exchanging means including internal walls through which heat is transferred from said geothermal hot water to said power fluid whereby said power fluid is vaporized, and means through which said vaporized power fluid is expanded to produce power, the improvement comprising a cleaning system including a source of relatively cold water, means for heating said cold water to a temperature nearly equal to or above said geothermal hot water temperature, said means including a heat exchanger in which said relatively cold water is heated by said geothermal hot water, means for removing said heat exchanging means from said geothermal power plant cycle, and means for passing said heated water into and through said heat exchanger when said heat exchanging means has been removed from said geothermal power plant cycle so that said heated water contacts those surfaces of said internal walls which were previously contacted by said geothermal hot water.

6. In a geothermal power plant including a source of geothermal hot water, a power fluid, and heat exchanging means including internal walls through which heat is transferred from said geothermal hot water to said power fluid whereby said power fluid is vaporized, and means through which said vaporized power fluid is expanded to produce power, the improvement comprising a cleaning system including a source of relatively cold water, means for heating said cold water to a temperature nearly equal to or above said geothermal hot water temperature, means for removing said heat exchanging means from said geothermal power plant cycle, means for introducing said heated water into and through said heat exchanger when said heat exchanging means has been removed from said geothermal power plant cycle so that said heated water contacts those surfaces of said internal walls previously contacted by said geothermal hot water, and means for connecting the output of heated water from said tubes with the source of geothermal hot water.

7. A method for cleaning mineral deposits from surfaces of the heat exchanger tubes used in a geothermal power plant comprising: heating a supply of relatively cold water which is relatively free of dissolved minerals nearly equal or above the temperature of the water from the geothermal source; introducing said heated water to said surfaces of said tubes to dissolve mineral deposits therefrom; and introducing the heated water which has passed over said surfaces into the input of geothermal hot water used in the geothermal power plant.

8. A method for cleaning mineral deposits from surfaces of the heat exchanger tubes used in a geothermal power plant comprising: heating a supply of relatively cold water which is relatively free of dissolved minerals nearly equal or above the temperature of the water from the geothermal source, said heating being carried at least in part by passing the relatively cold water in heat exchange relationship with water from the geothermal source; and introducing said heated water to said surfaces of said tubes to dissolve mineral deposits therefrom.

9. In a system for utilizing the heat obtainable from a source of geothermal hot water of the type including at least one heat exchanger having internal walls through which heat is transmitted from geothermal hot water to another fluid as said geothermal hot water and said other fluid flow through said heat exchanger, the improved means for removing mineral material deposited from said geothermal hot water on surfaces of said internal walls comprising means for heating a body of water of lower mineral content than the geothermal hot water to a temperature at last equal to the temperature of the geothermal hot water flowing through said heat exchanger, valve and conduit means for replacing the geothermal hot water flowing through said heat exchanger with heated low-mineral content water from said heating means whereby said heated water dissolves mineral material from said surfaces of said internal walls, and means for flowing the output of heated low-mineral content water from said heat exchanger to the geothermal hot water flowing from the source to the system.

10. In a method for utilizing the heat obtainable from a source of geothermal hot water in a system which comprises at least one heat exchanger, an improved method for cleaning mineral deposits from the surface of an internal wall in the heat exchanger through which wall heat is transferred from a stream of geothermal hot water in contact with said surface to a stream of another fluid, said method comprising: heating a supply of water of lower mineral content than said geothermal hot water from a relatively low temperature to a temperature at least equal to the geothermal hot water flowing through the heat exchanger; dissolving said mineral deposits by replacing the stream of geothermal hot water in the heat exchanger with a stream of the heated low mineral content water; and flowing the output of the heated low mineral content water from the heat exchanger to the stream of geothermal hot water prior to entry thereof into the system.

* * * * *